United States Patent [19]
Tuson et al.

[11] Patent Number: 5,113,334
[45] Date of Patent: May 12, 1992

[54] HIGH EFFICIENCY CONVERTER

[75] Inventors: Rodney R. Tuson, Wahroonga; Isaac Dimanstein, Hornsby, both of Australia

[73] Assignee: Rifala Pty. Ltd., Australia

[21] Appl. No.: 477,978

[22] PCT Filed: Oct. 28, 1988

[86] PCT No.: PCT/AU88/00419
§ 371 Date: Jun. 14, 1990
§ 102(e) Date: Jun. 14, 1990

[87] PCT Pub. No.: WO89/04082
PCT Pub. Date: May 5, 1989

[30] Foreign Application Priority Data
Oct. 29, 1987 [AU] Australia .................. PI5168

[51] Int. Cl.⁵ .................................. H02M 7/538
[52] U.S. Cl. .................................. 363/25; 363/97
[58] Field of Search .................. 363/24, 25, 26, 97

[56] References Cited
U.S. PATENT DOCUMENTS

| 4,383,292 | 5/1983 | Onodera et al. | 363/21 |
| 4,443,840 | 4/1984 | Geissler et al. | 363/24 |
| 4,720,668 | 1/1988 | Lee | 323/271 |
| 4,785,387 | 11/1988 | Lee | 363/21 |
| 4,823,249 | 4/1989 | Garcia | 363/48 |

FOREIGN PATENT DOCUMENTS
0265570 11/1988 Japan .

OTHER PUBLICATIONS
Patterson and Divan, Pseudo-Resonant Full Bridge DC/D Converter 18th Annual IEEE Power Elect. Spec. Control Jun. 21-26, 1987, pp. 424-430.

Primary Examiner—Steven L. Stephan
Assistant Examiner—Adolf Berhane
Attorney, Agent, or Firm—Evenson, Wands, Edwards, Lenahan & McKeown

[57] ABSTRACT

A high efficiency power conversion at high frequencies with zero voltage switching is obtained by using magnetizing current of a transformer or parallel inductance to charge the switch adjunct capacitance and other capacitance during the dead time. A transformer is prevented from being loaded during the dead time. Loading of the transformer during the dead time is prevented by directing the output inertial current to a capacitor instead of through the rectifiers to the secondary of the transformer. This can also be achieved by using synchronized rectification that provides pulse width modulated regulation on the output and ensures that the transformer secondary is separated from the inertial current of the output during the dead time. Voltage and current stresses on the switching devices and rectifiers are minimized. Zero voltage switching may be applied to inverters where the load is resistive.

6 Claims, 4 Drawing Sheets

HIGH EFFICIENCY CONVERTER

BACKGROUND AND SUMMARY OF THE INVENTION

The present invention relates to electrical power conversion apparatus, and more particularly, to DC-DC converters and, DC-AC inverters where two or more switching devices are switched in sequence, resulting in symmetrical switching, for example push-pull, full bridge and half bridge topologies.

Industry demands for increased density, that is more power transferred in a given volume, have led to the use of higher switching frequencies to minimize capacitor and magnetic core sizes. These higher frequencies require a greater attention to switching losses, which become a significant proportion of the total losses of the power conversion apparatus.

The sum of all the losses becomes even more important when an apparatus is required to be self-heatsinking. In a practical application, "power density" is best expressed as:

The amount of power delivered by a conversion device divided by the volume, defined by the extreme dimensions of the device expressed as a single geometric solid, and including a heatsink appropriate for a given airflow, MTBF (mean time before failure) and ambient temperature.

For high power density, it is necessary to increase the operating frequency of a converter in order to minimize the volume of magnetic components and capacitors. Whereas these volumes can thus be quite readily reduced, the volume of the heatsink is determined, for a given environment, by the power losses. Thus the installed power density is principally governed by the conversion efficiency. As the frequency is increased, switching losses of the switching and rectifying devices become significant, so a method of obtaining switching at zero voltage or zero current through the switching device at the time of switching is desirable.

With apparatus in which zero current switching is utilized, the dissipation caused by the product of the voltage across the switching device and the current through it, integrated over the period of the switch transition, is eliminated, but the dissipation caused by discharging the voltage on the parasitic capacitance of the switching device remains.

In zero voltage switching (ZVS), both the voltage current product integral and the discharge energy of the parasitic capacitance are eliminated. At higher switching frequencies, the parasitic capacitance energy is significant, therefore zero voltage switching is to be preferred for minimum losses.

Several techniques for obtaining ZVS have been proposed:

1. A Flyback quasi-resonant converter providing isolation has the disadvantage that high voltage stresses are presented to both the switching device and the output rectifier. Furthermore, ZVS is dependent on load current. At small load currents, ZVS does not occur.

2. A quasi-resonant forward converter has been proposed which achieves ZVS by using the magnetizing current of the transformer. The disadvantage is that high voltage, stresses are presented to the input switching device and the rectifier.

3. Charging the parasitic capacitance of the switching device with the magnetizing current and load current during the dead time (dead time being the period in which the switching device is turned off) has been used effectively on a full bridge converter and provides for pulse width modulated regulation A disadvantage is that an inductor in series with the transformer primary is required, and ZVS is dependent on load current.

4. A full bridge using the magnetizing current and the energy stored in the primary-secondary leakage inductance of the transformer has been proposed, but does not provide ZVS on all four switches.

5. A similar configuration can be used in a half bridge topology, with an inductor in series with the primary of the transformer. A disadvantage is, again, that ZVS depends on a certain minimum load. To achieve regulation, since the dead time must be maintained constant, operation at very high frequencies is necessary.

6. A further example is the high frequency power supply device disclosed in U.S. Pat. No. 4,553,199. All embodiments of this disclosure illustrated in FIGS. 1, 3, 4, 5, 6 and 7 of that patent show the use of a series inductive element and not the magnetizing inductance of the transformers and various methods are proposed for regulating the output.

These six examples illustrate the fundamental conclusion that, to achieve both ZVS and regulation within a converter, an inductance other than the magnetizing inductance of the transformer must be provided so as to give a ramp in the voltage of the parasitic capacitance in the dead time, during which the transformer is loaded. This conclusion gives rise to the necessary dependence on load current.

SUMMARY OF THE INVENTION

It is an object of the present invention to provide a zero voltage switching converter which is capable of operation at high frequencies with high efficiency at relatively low output voltage.

Line regulation within the converter is dispensed with, enabling the use of magnetizing inductance to provide the necessary reactive elements, together with the adjunct capacitances of the switching devices and other parasitic capacitances for zero voltage switching under all load conditions. To achieve ZVS in such a configuration, the transformer must not be loaded during the dead time.

For DC output converters using this principle and having inertial components such as inductors in the output, closed loop regulation is possible only if synchronised rectification is used which disconnects the transformer secondary from the output inertial components during the dead time. Alternatively, regulation must be provided in a pre-regulator or post-regulator, in which case, the feedback loop could be closed around the combined converter.

There is provided according to the present invention a zero voltage switching DC to AC inverter comprising a transformer having a given primary inductance, two or more switches combined to form two switching paths, a capacitance forming a resonant circuit with said primary inductance of the transformer, drive signals from a circuit or signal generator for controlling the switches resulting in approximately symmetrical switching of the switching paths and means to ensure that the transformer is not loaded during the time when neither of the symmetrical switching paths is conducting, wherein the drive signals are controlled to switch one of the switching paths on after a period of time when the other is switched off, sufficient to allow the phase of the voltage across the transformer to be inverted by the resonant circuit.

BRIEF DESCRIPTION OF THE DRAWINGS

These and other features, objects and advantages of the present invention will become more apparent from the following detailed description of a presently preferred embodiment when taken in conjunction with the accompanying drawings wherein.

PREFERRED EMBODIMENT OF THE INVENTION

Figure 1:
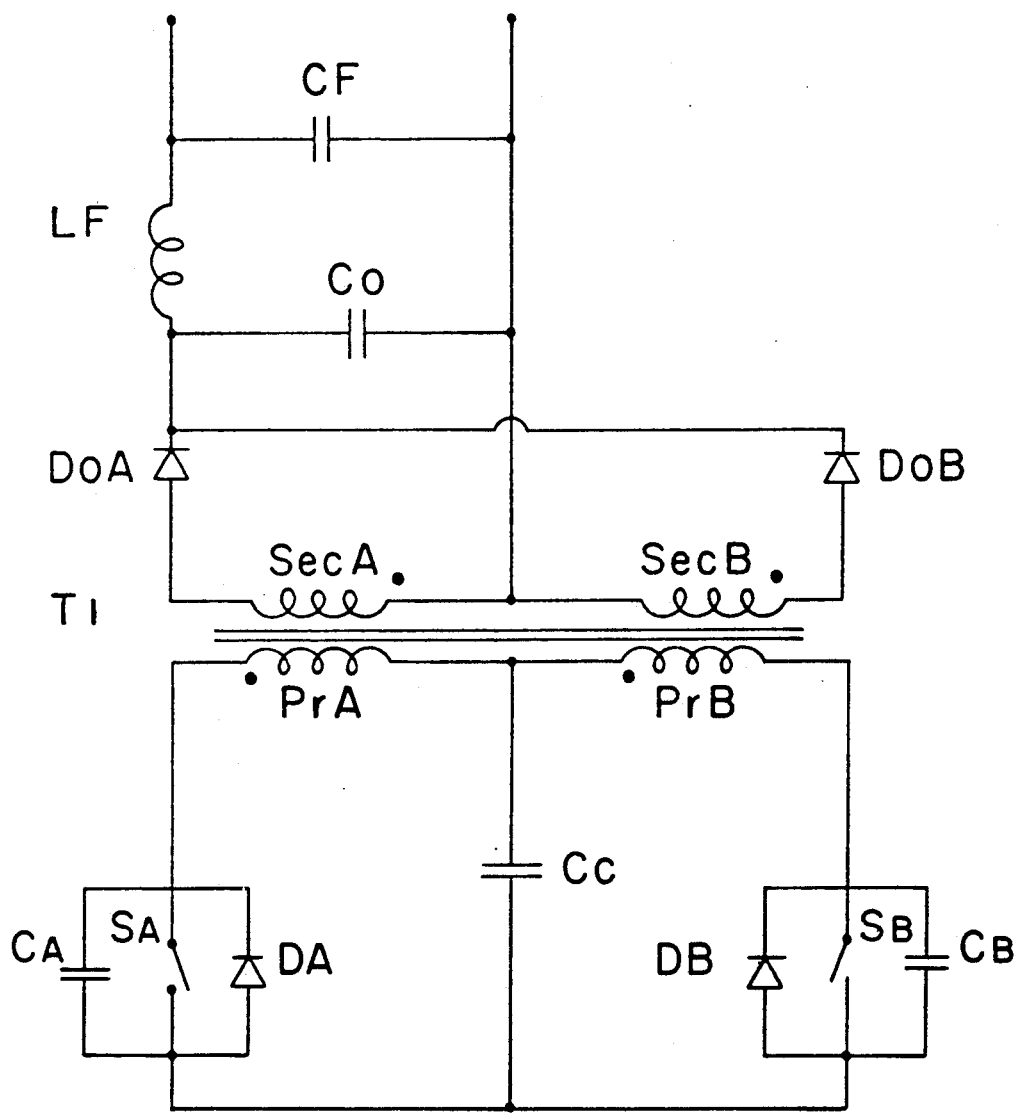
FIG. 1 shows a schematic diagram of the power train of a Push-pull DC-DC Converter embodying the principles of the invention.
Figure 2:
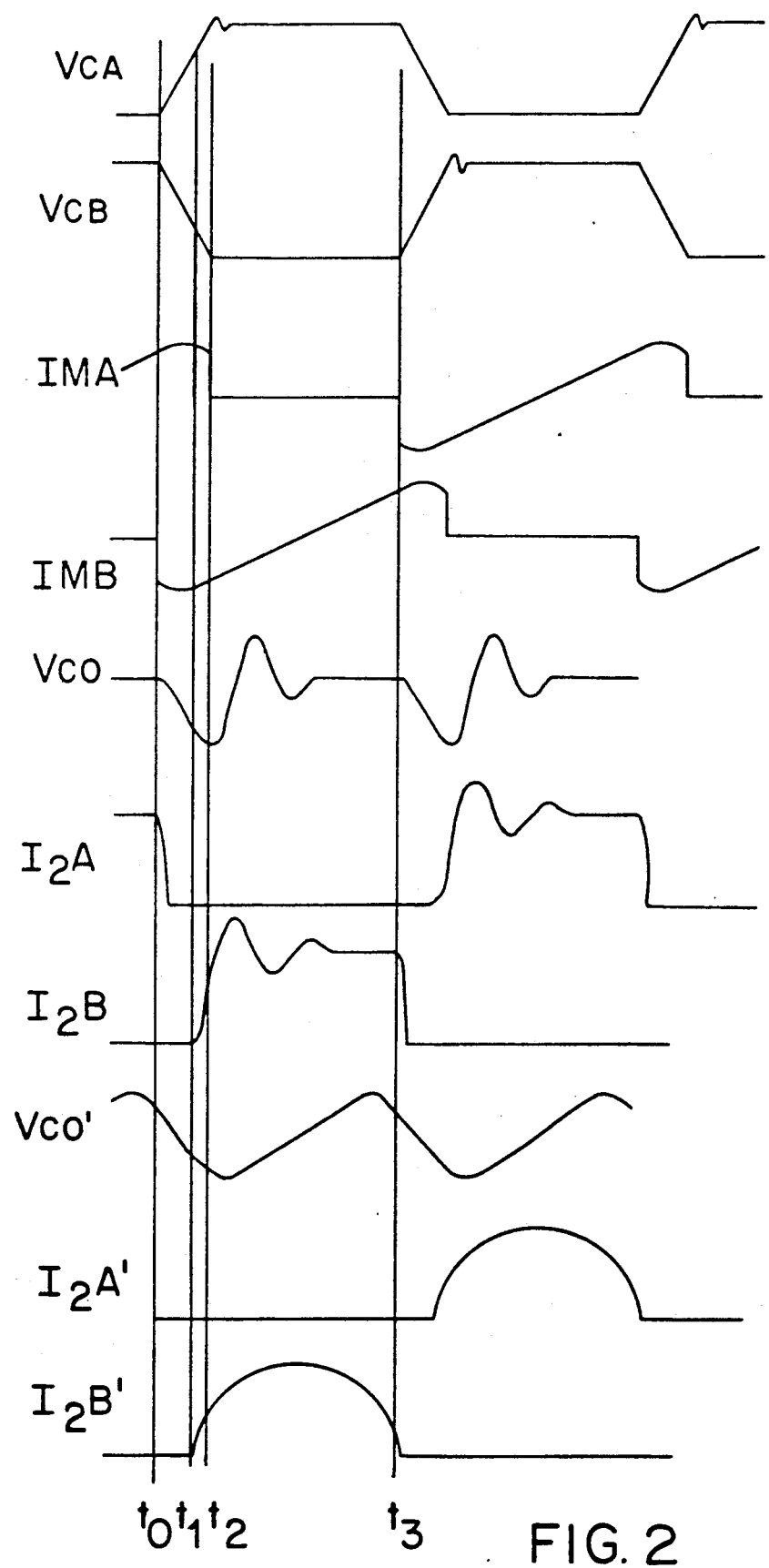
FIG. 2 shows waveforms related to the push-pull converter embodiment of the present invention.

Following is a description of a preferred embodiment of a ZVS DC-DC converter shown in FIG. 1 in which switching occurs independently of load current, with reference to the drawings.

Prior to t0 switch SA is on. Magnetizing current and load current are flowing through switch SA. At time t0, SA is caused to turn off. The transformer T1 has leakage inductance, which has energy associated with it. When switch SA is turned off this energy continues to flow to the output capacitor CO, and, at the same time, will charge CA, the switch capacitance of SA by a small amount, and discharge CB, the capacitance of switch SB by a small amount. At the same time magnetizing current will continue to flow in the same direction and charge the capacitance of SA.

Because the capacitance CA is being charged, the voltage across the transformer primary A will decrease. Because primaries A and B are wound on the same core, the voltage on B will decrease by the same amount. This means that Capacitor CB will start to discharge. Magnetizing current then starts to flow between the two switches rather than between capacitor CC and SA or SB. The magnetizing current flows in a positive direction into SA and a negative direction from SB. The voltage across the transformer starts to change polarity, so the same occurs on the secondary.

The voltage across the transformer secondary B starts to increase in a positive direction. At this time no current is flowing through the rectifier diodes, since the secondary voltage is less than the sum of the voltage on Vo and the forward voltage drop of the rectifier, which means that Co starts to discharge at a rate determined by the output current At t1, the voltage across secondary B will be equal to the voltage across Co plus the voltage drop on the rectifier. Then current will start to flow through the rectifier B and primary B into capacitor CB, because switch SB is still open. The current does not rise immediately, but rises gradually because of the leakage inductance of the transformer.

At time t2, the voltage across CB will reach zero, and the voltage across CA will be twice the input voltage. Until this time, the load current in primary B must be smaller in magnitude than the magnetizing current, otherwise, the total amount of current that flows into CB will be positive, and CB will not reach zero. At time t2, the switch SB is closed, and remains closed until time t3. During this time, current flows from SB through the transformer into the load.

In the preferred embodiment of FIG. 1, SA and SB are surface-mounted MOSFET switches which have integral adjunct capacitance CA and CB, and integral adjunct body diodes DA and DB. The switches chosen, for an input voltage of approximately 40V DC, are 100V types, the peak amplitude of the drain voltage being only a few volts above twice the input voltage. CC is the input filter capacitor.

Very large die MOSFETS could be employed because the output capacitance is used advantageously. The gate-source capacitance, however, must be driven by the driver circuit. Smaller types are chosen by minimizing the total of drive circuit dissipation added to MOSFET conduction resistive losses. Because of the smaller voltage stress, lower resistance FETS may be selected for a given gate-source capacitance. The Miller effect capacitance is ignored because of zero voltage switching, as is the Drain Gate capacitance.

The transformer T1 is spiral wound using multilayer printed circuit board fabrication techniques, the multilayer board being a single piece, containing all the wiring and interconnections to the components and comprising 8 layers. The multilayer technique provides tight control of leakage inductance and winding resistance, while the use of 8 layers, 70 microns thick, provides a large cross-sectional area of copper, while minimising skin effect. The ferrite core is assembled to both sides of the board, the core center pole passing through a centre hole in the board and the outer edge of the board routed to suit the optimum shape of the core.

Figure 4A:
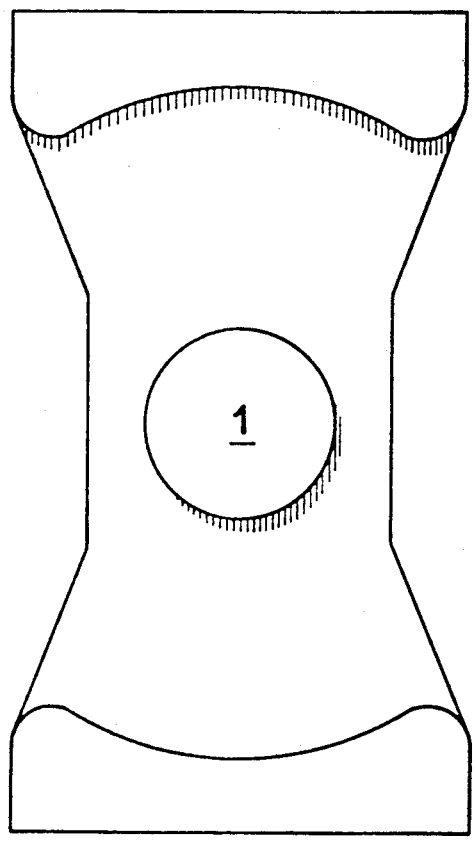
FIG. 4A and 4B show a plan and elevation of the transformer core of the converter.
Figure 4B:
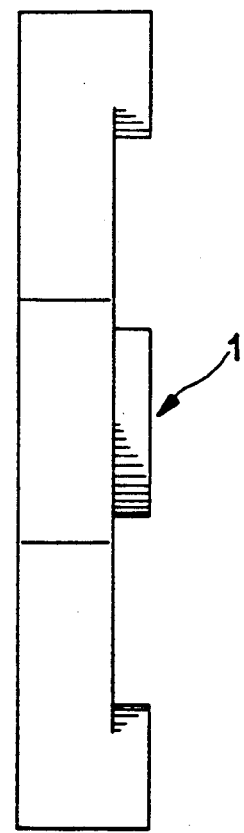

The transformer core shown in FIGS. 4A and 4B has been designed to minimise both winding losses and core losses. Because the center pole 1 is very short, its total volume is very small The diameter and hence the cross-sectional area is reduced to about half the cross-sectional area, of the rest of the core The flux density in the center pole of the core 1 is therefore relatively high, twice as high as the average The core loss per unit volume in this center pole is quite high, but because of the small volume arising from the short length of the center pole, the power, loss is low. The smaller diameter of the center pole means that the winding resistance can be greatly reduced, compared to a core topology which has been optimised for bobbin wound manufacture, because there is smaller average path length for each winding turn, and more area on the board between the inner pole and the outer legs for copper.

The principle of this aspect of the invention is implemented when the center pole is deliberately reduced in diameter, preferably such that flux density in the center core is at least 35% higher than the average flux density for the rest of the transformer core.

Rectifiers $D_oA$ and $D_oB$ on each secondary are very low forward drop devices designed for 20V reverse voltage. These optimum types can be used because of the low voltage stress provided by the principle of operation of this converter.

Capacitor Co is of low equivalent series resistance and serves to provide a current path for the inertial current of the output inductor LF during the dead time. The selection of the size of Co is determined by the need to ensure that the capacitor does not discharge below a value which ensures the above.

Inductor LF, constructed by attaching cores over multiple single turn layers of the board, and capacitor CF, form a simple output ripple filter to ensure very low output ripple voltage.

At t0, switch SA is on. Just before t0, load current and magnetizing current are flowing into switch SA. The losses on this MOSFET switch are now simple conduction losses. There are also at this time copper losses in the transformer, rectifier conduction losses and some stray resistive losses due to interconnections.

At time t0, switch SA is caused to turn off by the driver circuit. A small loss is associated with the driver discharging the gate-source capacitance. The transformer T1 has primary to secondary leakage inductance, and this inductance has energy associated with it due to the load current. When switch SA is turned off, this energy continues to flow to the output capacitor, CO, and, at the same time, will charge CA, the switch capacitance of SA, by a small amount, and discharge CB, the capacitance of switch SB, by a small amount. At the same time, the magnetizing current will continue to flow in same direction and charge CA switch the capacitance of SA.

Between time t0 and t2, the primary inductance of the transformer T1 resonates with the switch capacitances CA and CB, the curve between t0 and t2 being shown in the waveforms of IMA and IMB.

Because the capacitor CA is being charged, the voltage across primary A will decrease, and because primaries A and B are wound on the same core, the voltage on primary B will decrease by the same amount There is a very small delay and a small, well damped ringing, due to the leakage inductance between the two windings of the primaries.

This means that Capacitor CB will start to discharge. Magnetizing current then starts to flow between the two switches rather than between the input capacitor CC and either switch SA or SB. The magnetising current flows in a positive direction into SA and a negative direction from SB. The voltage across the transformer T1 starts to change polarity, so the same occurs on the secondary.

The voltage across Secondary B starts to increase in a positive direction. At this time no current is flowing through the rectifier diodes DOA, DOB, since the secondary voltage is less that the sum of the voltage on Co and the forward voltage drop of the rectifier, which means that Co starts to discharge at a rate determined by the output current and the size of Co.

At time t1, the voltage across secondary B will be equal to the voltage across Co plus the voltage drop on the rectifier. Then current will start to flow through the rectifier B and primary B into capacitor CB, because switch SB is still open. The output current does not rise immediately, but rises gradually because of the leakage inductance of the transformer.

At time t2, the voltage across CB will reach zero, and the voltage across CA will be twice the input voltage. From t1 to t2, the load current in primary B must be smaller in magnitude than the magnetizing current; otherwise, the net amount of current that flows into CB will be positive, and the voltage on CB will not reach zero. The voltage on CB is thus reducing, and at time t2, before the voltage VCB passes zero and becomes negative, that is, before the integral body diode starts to conduct, the switch SB is closed, and remains closed until time t3.

The principle of this invention does not preclude the use of the integral body diode of the switches. However, the diode is not so used for the following reasons. The dead time becomes longer than necessary as the VCB has already passed zero. Furthermore, to continue to achieve ZVS, the magnetizing current must be increased so as to ensure that sufficient magentizing current flows through the body diode to oppose the commencement of the load current between t1 and t2. Because the dead time is longer, there is either a larger ripple voltage on Co, or a larger size Co for a given output ripple. In other words, the period between t1 and t2 is lengthened unnecessarily.

From time t2 until time t3, magnetising current flows from CC to CB. Because of the leakage inductance between primary A and primary B, energy is stored in this leakage inductance due to the magnetizing current. This current continues to flow into capacitor CA, charging it above twice the input voltage, so a small ringing occurs between the primary-primary leakage inductance and capacitor CA. This ringing gives rise to some dissipation. The loss is very low, since only magnetizing current is involved, and the leakage inductance is very low. From the time t2 to t3, current flows from SB through the transformer into the load.

Ringing shown on the waveform diagram $I_2A$ and $I_2B$ is due to Co resonating with the leakage inductance of the transformer. If Co is increased, or the leakage inductance of the transformer increased, for example by adding an extra inductor, the output circuit can be "resonated" so that only a half sine wave is present as the secondary current waveform as shown in $I_2A$, and $I_2B$. If this option is followed, zero current switching of the output devices is obtained, and the electro magnetic interference of the converter is further reduced.

The ringing shown on $I_2A$ and $I_2B$ is non-dissipative, because it occurs between the two reactive components, the leakage inductance of the transformer T1 and the capacitor Co. The damping of the ringing is caused by the resistance of the transformer T1 and the rectifier, and while the peak resistive loss varies over the time t2 to t3 between greater than and less than an optimum square wave, the average for the period virtually identical. Experimental results have proven that resonating the secondary current as shown in $I_2A'$ and $I_2B'$ makes negligible difference to the losses.

VCO and VCO' represent the voltage present across capacitor Co in the cases corresponding to $I_2A$ and $I_2A'$ respectively.

On the curves, between t1 and t2, there is an apparent power loss because neither VCB nor IB are zero. However, this is not dissipative, as at this time SB is open and the current is simply charging CB, the parasitic capacitance of SB.

It will be apparent that magnetizing current can be adjusted to a desired level by means of a parallel inductance, and that the adjunct capacitance of the switches may likewise be adjusted by the addition of parallel capacitance.

At t3, the process is repeated in symmetry, as it is at t0, but substituting SB for SA, CB for CA, etc.

Figure 3:
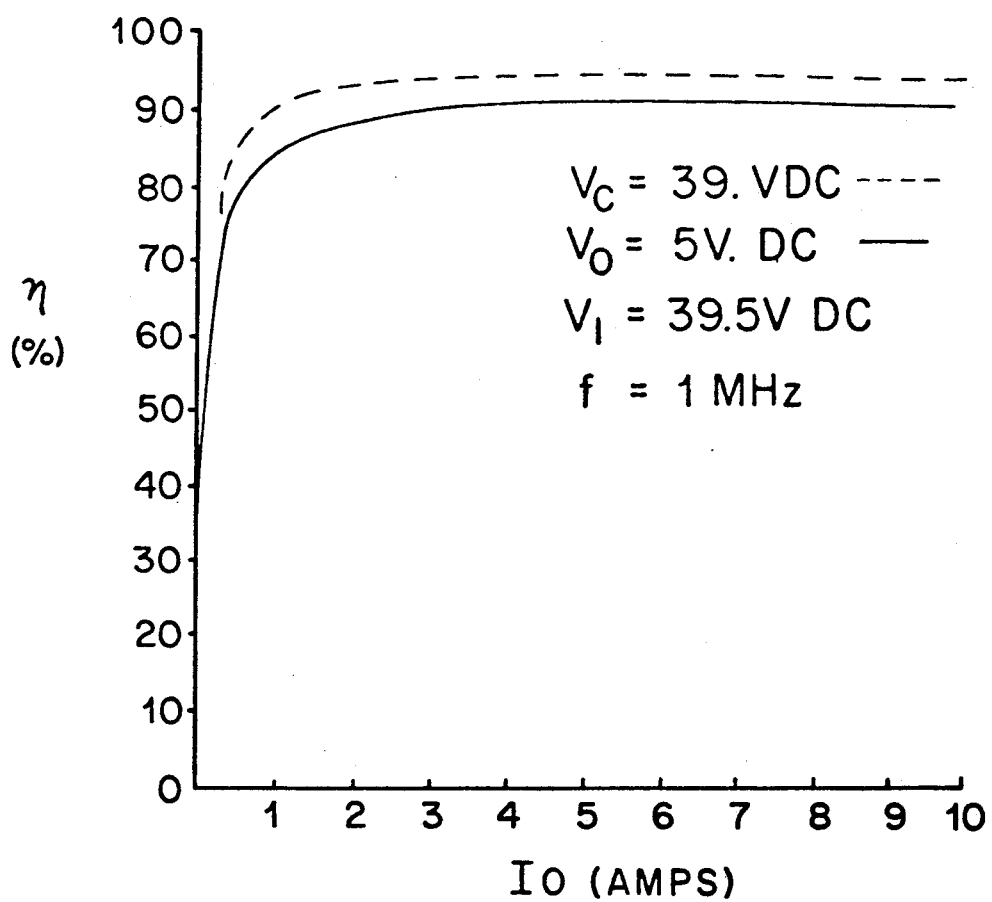
FIG. 3 shows conversion efficiency as a function of output current.

Referring to FIG. 3, the overall efficiency of the present invention, plotted against output current is shown. Two variations are illustrated, one optimized for 39V DC output, another for 5V DC output. It will be noted by those skilled in the art that the efficiency is extremely high in both cases, even for loads as small as 10% of the rated load. This results substantially from the independence on load current of zero voltage switching.

We claim:

1. A zero voltage switching DC to AC inverter comprises:

transformer means having a given primary inductance, two or more switching means having adjunct capacitance, and optionally further capacitance means, said switching means combined with said transformer means to form two switching paths, said adjunct capacitance means and optional further capacitance means forming a resonant circuit with said primary inductance of said transformer, drive signals from a circuit or signal generator for controlling said switching means resulting in substantially symmetrically switching of the said switching paths and means to ensure that the said transformer is not loaded during the time when neither of the said symmetrical switching paths is conducting, wherein the said drive signals are controlled to switch on the switching means in one of the switching paths after a period of time when the switching means in the other switching path is switched off, sufficient to allow the phase of the voltage across said transformer to be inverted by said resonant circuit.

2. A DC to AC inverter as in claim 1 having one or more inductances connected in parallel with one or more windings of the said transformer.

3. A DC to AC inverter as in claim 1 or claim 2, including means for rectification to obtain a DC output and wherein the means for ensuring the transformer is not loaded during the dead time is provided by a capacitance.

4. A DC to AC inverter as in claim 3, wherein the capacitance means for ensuring the transformer is not loaded during the dead time is caused to resonate with the leakage inductance of the transformer, or a separate inductor, so that approximately a half cycle of resonance of the secondary current occurs during the conduction of one of the said switching paths.

5. A DC to AC inverter as in claim 1 or claim 2, and including means for rectification to obtain a DC output wherein the means for ensuring the transformer is not loaded during is provided by rectifying devices which can be controlled so as not to conduct during the dead time.

6. A converter or inverter s in any one of claims 1 to 5 wherein the centre core of the said transformer has been so reduced in diameter as to result in a flux density in said core of more than 35% higher than the average flux density for the rest of the transformer core.

* * * * *